US012434814B2

(12) United States Patent
Richter et al.

(10) Patent No.: US 12,434,814 B2
(45) Date of Patent: *Oct. 7, 2025

(54) SYSTEM AND METHODS FOR FLIGHT CONTROL FOR AN ELECTRIC AIRCRAFT

(71) Applicant: BETA AIR, LLC, South Burlington, VT (US)

(72) Inventors: Timothy Gerard Richter, South Burlington, VT (US); Joshua E. Auerbach, Waterbury Center, VT (US); Andrew Giroux, South Burlington, VT (US); Herman Wiegman, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 191 days.

This patent is subject to a terminal disclaimer.

(21) Appl. No.: 18/097,072

(22) Filed: Jan. 13, 2023

(65) Prior Publication Data

US 2023/0227146 A1    Jul. 20, 2023

Related U.S. Application Data

(63) Continuation of application No. 17/848,882, filed on Jun. 24, 2022, now Pat. No. 11,851,159, which is a
(Continued)

(51) Int. Cl.
*H04W 4/40* (2018.01)
*B64C 13/16* (2006.01)
(Continued)

(52) U.S. Cl.
CPC ............ *B64C 13/16* (2013.01); *B64C 13/503* (2013.01); *H04W 4/40* (2018.02); *H04W 72/569* (2023.01); *B64C 29/0033* (2013.01)

(58) Field of Classification Search
CPC ... B64C 13/503; B64C 13/16; B64C 29/0033; B64D 27/24; H04W 72/569; H04W 72/1242; H04W 4/40
See application file for complete search history.

(56) References Cited

U.S. PATENT DOCUMENTS

| 3,848,833 A | 11/1974 | Rauschelbach |
| 4,146,200 A | 3/1979 | Borzachillo |

(Continued)

FOREIGN PATENT DOCUMENTS

| CN | 207274974 U | 4/2018 |
| CN | 110127041 A | 8/2019 |

(Continued)

OTHER PUBLICATIONS

Kang et al., Flight test results of automatic tilt control for small scaled tilt rotor aircraft, 2008, IEEE, p. 47-51 (Year: 2008).*
(Continued)

Primary Examiner — McDieunel Marc
(74) Attorney, Agent, or Firm — Lee & Hayes, P.C.

(57) ABSTRACT

The present disclosure is generally directed to a flight control system and method of flight control for an electric aircraft. The system includes a pilot input communicatively connected to an electric aircraft, wherein the pilot input is configured to receive an input datum, and plurality of flight components communicatively connected to the electric aircraft, wherein the plurality of flight components includes a plurality of control surfaces. The system also includes a flight controller, wherein the flight controller is configured to determine a phase of flight, determine a command datum to control a position of the plurality of control surfaces as a function of the input datum, and command, when the phase of flight is determined to be hover, the plurality of control surfaces using the command datum.

20 Claims, 5 Drawing Sheets

Related U.S. Application Data continuation of application No. 17/383,703, filed on Jul. 23, 2021, now Pat. No. 11,377,201, application No. 18/097,072 is a continuation-in-part of application No. 17/515,124, filed on Oct. 29, 2021, now Pat. No. 11,679,867, which is a continuation of application No. 17/349,631, filed on Jun. 16, 2021, now Pat. No. 11,952,105, which is a continuation-in-part of application No. 17/197,427, filed on Mar. 10, 2021, now Pat. No. 11,142,333, application No. 18/097,072 is a continuation-in-part of application No. 17/972,856, filed on Oct. 25, 2022, now Pat. No. 11,822,328, which is a continuation-in-part of application No. 17/218,428, filed on Mar. 31, 2021, now Pat. No. 11,524,767.

(51) Int. Cl.
*B64C 13/50* (2006.01)
*H04W 72/566* (2023.01)
*B64C 29/00* (2006.01)

(56) References Cited

U.S. PATENT DOCUMENTS

| | | | |
|---|---|---|---|
| 4,236,685 A | 12/1980 | Kissel | |
| 5,559,415 A | 9/1996 | Gregory | |
| 6,860,452 B2 | 3/2005 | Bacon et al. | |
| 6,913,228 B2 | 7/2005 | Lee | |
| 6,921,045 B2 | 7/2005 | Chang et al. | |
| 7,357,352 B2 | 4/2008 | Speer | |
| 8,548,648 B2 | 10/2013 | Sahasrabudhe | |
| 8,831,816 B2 | 9/2014 | Kwon | |
| 9,266,608 B2 | 2/2016 | Sahasrabudhe | |
| 9,527,588 B1 | 12/2016 | Rollefstad | |
| 9,533,751 B2 | 1/2017 | Lin et al. | |
| 9,938,011 B2 | 4/2018 | Rollefstad | |
| 9,958,874 B2 | 5/2018 | Yu | |
| 10,120,662 B1 | 11/2018 | Furman | |
| 10,281,890 B1 | 5/2019 | Kroo | |
| 10,315,753 B2 | 6/2019 | Mccormick et al. | |
| 10,370,088 B2 | 8/2019 | Morrison | |
| 10,479,223 B2 | 11/2019 | Demont | |
| 10,494,095 B2 | 12/2019 | Groninga | |
| 10,526,066 B2 | 1/2020 | Suzuki et al. | |
| 10,589,635 B1 | 3/2020 | Solodovnik | |
| 10,826,137 B2 | 11/2020 | Zheng | |
| 10,831,192 B1 | 11/2020 | Piasecki | |
| 10,877,487 B2 | 12/2020 | Irwin, III | |
| 10,906,656 B2 | 2/2021 | Gilliland | |
| 10,988,248 B2 | 4/2021 | Mikic | |
| 11,142,330 B2 | 10/2021 | Papas et al. | |
| 11,142,333 B1 | 10/2021 | Richter | |
| 11,198,519 B1 | 12/2021 | Seeley | |
| 11,254,219 B2 | 2/2022 | Clark | |
| 11,349,326 B2 | 5/2022 | Krieg | |
| 11,420,534 B1* | 8/2022 | Palombini | B64C 29/0016 |
| 11,442,472 B1* | 9/2022 | List | B64D 45/00 |
| 11,443,569 B1 | 9/2022 | Churchill | |
| 11,447,269 B2 | 9/2022 | Seeley | |
| 11,465,532 B2* | 10/2022 | Marius | H02J 7/0013 |
| 11,518,497 B2 | 12/2022 | Spiegel | |
| 11,524,767 B2 | 12/2022 | Moy | |
| 11,560,225 B2 | 1/2023 | Spiegel | |
| 11,623,738 B1 | 4/2023 | Auerbach | |
| 11,651,703 B1 | 5/2023 | Hall | |
| 11,679,867 B2 | 6/2023 | Giroux | |
| 11,694,569 B2 | 7/2023 | Hall | |
| 11,794,919 B2 | 10/2023 | Wiegman | |
| 11,822,328 B2 | 11/2023 | Moy | |
| 11,897,626 B2 | 2/2024 | Guthrie | |
| 11,952,105 B2 | 4/2024 | Giroux | |
| 11,958,590 B2 | 4/2024 | Schreiber | |
| 12,088,077 B1 | 9/2024 | Lohe | |
| 2006/0255207 A1 | 11/2006 | Wingett et al. | |
| 2007/0032951 A1 | 2/2007 | Tanenhaus | |
| 2009/0266939 A1 | 10/2009 | Hanlon | |
| 2012/0053735 A1 | 3/2012 | Tessier | |
| 2012/0258639 A1 | 10/2012 | Rolla | |
| 2016/0032866 A1 | 2/2016 | Cameron | |
| 2016/0059958 A1 | 3/2016 | Kvitnevskiy | |
| 2016/0236790 A1 | 8/2016 | Knapp | |
| 2016/0244144 A1 | 8/2016 | Karem | |
| 2016/0376003 A1 | 12/2016 | Feldman | |
| 2017/0159574 A1 | 6/2017 | Paul | |
| 2017/0250628 A1 | 8/2017 | Tian | |
| 2018/0237148 A1 | 8/2018 | Hehn | |
| 2018/0251207 A1 | 9/2018 | Kim | |
| 2018/0265190 A1 | 9/2018 | Fortenbaugh | |
| 2018/0362146 A1 | 12/2018 | Klein | |
| 2019/0002115 A1 | 1/2019 | Miller | |
| 2019/0004542 A1 | 1/2019 | Kim | |
| 2019/0071172 A1 | 3/2019 | Caldwell | |
| 2019/0155282 A1 | 5/2019 | Kim | |
| 2019/0196509 A1 | 6/2019 | Hagerott | |
| 2019/0202546 A1 | 7/2019 | Mahboubi | |
| 2019/0265729 A1 | 8/2019 | Gillett | |
| 2019/0329868 A1 | 10/2019 | Morrison | |
| 2019/0332126 A1 | 10/2019 | Irwin, III | |
| 2020/0031478 A1 | 1/2020 | Clark | |
| 2020/0094982 A1 | 3/2020 | Saunders et al. | |
| 2020/0156636 A1 | 5/2020 | Oh | |
| 2020/0198618 A1 | 6/2020 | Nagasawa | |
| 2020/0277080 A1 | 9/2020 | Wiegman | |
| 2020/0290742 A1 | 9/2020 | Kumar | |
| 2020/0307390 A1 | 10/2020 | Clark | |
| 2020/0333805 A1 | 10/2020 | English | |
| 2020/0398992 A1 | 12/2020 | Morrison | |
| 2021/0053676 A1 | 2/2021 | Brand | |
| 2021/0109547 A1 | 4/2021 | Clark | |
| 2021/0139138 A1 | 5/2021 | Clark | |
| 2021/0291996 A1* | 9/2021 | Bosma | B60L 50/66 |
| 2021/0339813 A1 | 11/2021 | Bevirt et al. | |
| 2021/0347473 A1 | 11/2021 | Dietrich et al. | |
| 2022/0163978 A1 | 5/2022 | Moon | |
| 2022/0194613 A1* | 6/2022 | Lima | B64D 27/10 |
| 2022/0258647 A1 | 8/2022 | Joao | |
| 2022/0258873 A1 | 8/2022 | Bernard | |
| 2022/0269291 A1 | 8/2022 | Teles Ferreira et al. | |
| 2022/0289363 A1* | 9/2022 | Giroux | H04W 4/40 |
| 2022/0289379 A1* | 9/2022 | Morrison | H01M 8/0494 |
| 2022/0407159 A1 | 12/2022 | Schreiber | |
| 2023/0302961 A1 | 9/2023 | Braedon | |
| 2024/0182156 A1 | 6/2024 | Schreiber | |
| 2024/0375768 A1 | 11/2024 | Giroux | |

FOREIGN PATENT DOCUMENTS

| | | |
|---|---|---|
| CN | 110647160 A | 1/2020 |
| CN | 113830288 A | 12/2021 |
| EP | 2206645 B1 | 9/2011 |
| EP | 3176406 A1 | 6/2017 |
| EP | 3370129 B1 | 4/2019 |
| EP | 3613671 A1 | 2/2020 |
| RU | 2247432 | 2/2005 |
| RU | 2440915 C2 | 1/2012 |
| RU | 2678725 | 1/2019 |
| TR | 113830288 A | 12/2021 |
| WO | 2006/113391 A2 | 10/2006 |
| WO | 2015/180171 A1 | 12/2015 |
| WO | 2016/193884 A1 | 12/2016 |
| WO | 2019/212744 A1 | 11/2019 |
| WO | 2020/222674 A1 | 11/2020 |
| WO | WO2021035623 A1 | 3/2021 |

OTHER PUBLICATIONS

Green et al., A Hybrid MAV for Ingress and Egress of Urban Environments, 2009, IEEE, p. 253-263 (Year: 2009).*

Silva et al., Control validation with software-in-the-loop for a fixed-wing vertical takeoff and landing unmanned aerial vehicle with multiple flight stages, 2019, IEEE, p. 1222-1227 (Year: 2019).*

(56) References Cited

OTHER PUBLICATIONS

Green et al., A fixed-wing aircraft for hovering in caves, tunnels, and buildings, 2006, IEEE, p. 1092-1097 (Year: 2006).*
Robert Hilbrich, Laurent Dieudonné, Deploying Safety-Critical Applications on Complex Avionics Hardware Architectures, Dec. 31, 2013.
Lei Wang, Reconfigurable Flight Control Design for Combat Flying Wing with Multiple Control Surfaces, Aug. 31, 2012.
Campa et al. (Jun. 2004). Design of control laws for maneuvered formation flight. In Proceedings of the 2004 American Control Conference vol. 3, Jun. 2004, pp. 2344-2349.
Clarke et al., X-57 power and command system design, 2017, IEEE, p. 393-400 (Year: 2017).
Donovan, "Development of a Flight Controller for the Delta Space Research Vehicle", IEEE, 1960, pp. 406-411.
Ducard et al., Hexacopter Flight Performance Comparison with CCA vs. WCA Control Allocation, 2020, IEEE, p. 697-702 (Year: 2020).
Duda et al., Design and analysis of lunar lander manual control modes, 2009, IEEE, p. 1-16 (Year: 2009).
Fugaro et al., Aeronautical hybrid propulsion for More Electric Aircraft: a case of study, 2018, IEEE, p. 1-6 (Year: 2018).
Hon-Qi, et al., "A Design of Flight Control System for Four-Rotor Micro Aerial Vehicle", 2015, IEEE, pp. 1447-1451.
Horn, "Non-Linear Dynamic Inversion Control Design for Rotorcraft," Retrieved from the internet at: https://www.mdpi.com/2226-4310/6/3/38/pdf, Mar. 18, 2019.
Hossein, et al., "The Design, Implementation, and Stability Analysis of a Human-Inspired Dome-Tethered Robot", IEEE, 2014, pp. 648-653.
Jackson et al., ROSflight: A Lean Open-Source Research Autopilot, 2020, IEEE, p. 1173-1179 (Year: 2020).
Kulkarni et al., "On-Board Battery Monitoring and Prognostics for Electric-Propulsion Aircraft", 2018, IEEE, p. 1-12.
Lee et al., Active power management system for an unmanned aerial vehicle powered by solar cells, a fuel cell, and batteries, 2014, IEEE, p. 3167-3177 (Year: 2014).
Liu et al., "A multi-module battery system based on MODBUS for a hybrid aircraft", 2012, IEEE, 2012, p. 1-6.
Liu, et al., "An L1 Adaptive Roll and Pitch Angle Controller for Quadrotors", IEEE, 2016, pp. 2437-2478.
Magsino et al., Stabilizing quadrotor altitude and attitude through speed and torque control of BLOC motors, 2014, IEEE, p. 438-443 (Year: 2014).
Maldonado et al., "Power management and distribution system for a more-electric aircraft" (Madmel), 1999, IEEE, p. 3-8.
Kristofer Kevin Nemirsky, Simulated Annealing-Based Optimal Proportional-Integral-Derivative (PID) Controller Design: A Case Study on Nonlinear Quadcopter Dynamics, Date: May 2017. Web Site: http://scholarworks.sjsu.edu/cgi/viewcontent.cgi?article=8363&context=etd_theses.

Office Action for U.S. Appl. No. 17/478,143, mailed on Jan. 4, 2024, Moy, "Methods and Systems for Flight Control Configured for Use in an Electric Aircraft", 10 Pages.
Abhay A Pashikar, "Design of Nonlinear Flight Controller for Fighter Aircraft," Retrieved from the internet at: https://core.ac.uk/download/pdf/31237773.pdf, Mar. 15, 2014.
Rajashekara, "Power Electronics for More Electric Aircraft", 2014, IEEE, p. 365-386.
Search Report and Written Opinion for International Application No. PCT/US2024/021272, Dated Jun. 19, 2024, 13 pages.
Ezra Tal, et al., Accurate tracking of aggressive quad rotor trajectories using incremental nonlinear dynamic inversion and differential flatness, Date: Jun. 19, 2020. Web Site: https://arxiv.org/pdf/1809.04048.
Arjan J.C. Van Gemund, "In4073 QR Controller Theory (2011-2012)," Retrieved from the internet at: https://citeseerx.ist.psu.edu/viewdoc/download?, Feb. 2012.
Wang, et al., "Design and Experiment of Rudder Load Simulator for High Dynamic Aircraft", IEEE, 2009, p. 2573-2577.
Wang et al., Flight Test of L1 Adaptive Control on 120-kg-Class Electric Vertical Take-Off and Landing Vehicles, 2021, IEEE, p. 163906-163928 (Year: 2021).
Xu et al., Full Attitude Control of an Efficient Quad rotor Tail-sitter Vtol Uav with Flexible Modes, 2019, IEEE, p. 542-550 (Year: 2019).
Zhang, et al., "Insulators Recognition for 220kv/330kv High-voltage Live-line Cleaning", IEEE, 2006, pp. 1-4.
Barry et al., "In-Flight Simulators", IEEE, 1986, p. 10-16.
Estebe et al., "Power supply for a wireless sensor network: Airliner flight test case study", 2014, IEEE, p. 707-711.
Gilyard, "In-flight transport performance optimization: an experimental flight research program and an operational scenario", 1997, IEEE, p. 1-17.
Lawhorn et al., "Electric Aircraft System Co-Simulation Including Body, Propeller, Propulsion, and Energy Storage Models", 2019, IEEE, p. 1-5.
Office Action for U.S. Appl. No. 18/600,498, mailed on Oct. 4, 2024, 12 pages.
Office Action for U.S. Appl. No. 18/439,170, dated Oct. 4, 2024, 8 pages.
Potteiger et al., "A dependable, prognostics-incorporated, N-S modular battery reconfiguration scheme with an application to electric aircraft", 2017, IEEE, p. 1-9.
Saha et al., "Battery health management system for electronic UAVs", 2011, IEEE, p. 1-9.
Treacy, "Flight Safety Issues of an All-Electric Aircraft", IEEE, 1984, p. 1-7.
Office Action for U.S. Appl. No. 17/478,143, Dated Aug. 1, 2024, Moy, "Methods and Systems for Flight Control Configured for Use in an Electric Aircraft", 16 pages.

* cited by examiner

SYSTEM AND METHODS FOR FLIGHT CONTROL FOR AN ELECTRIC AIRCRAFT

CROSS-REFERENCE TO RELATED APPLICATIONS

This application is a continuation-in-part of Non-provisional application Ser. No. 17/848,882 filed on Jun. 24, 2022, and entitled "SYSTEMS AND METHODS FOR FLIGHT CONTROL OF AN ELECTRIC VERTICAL TAKEOFF AND LANDING AIRCRAFT," which is a continuation of Nonprovisional application Ser. No. 17/383,703, filed on Jul. 23, 2021, and entitled "A SYSTEM AND METHOD FOR FLIGHT CONTROL OF AN ELECTRIC VERTICAL TAKEOFF AND LANDING AIRCRAFT," the entirety of both are incorporated herein by reference. This application is a continuation-in-part of Non-provisional application Ser. No. 17/515,124 filed on Oct. 29, 2021, and entitled "SYSTEMS AND METHODS FOR FLIGHT CONTROL IN AN ELECTRIC AIRCRAFT," which is a continuation of Non-provisional application Ser. No. 17/349,631 filed on Jun. 16, 2021 and entitled "SYSTEM AND METHOD FOR FLIGHT CONTROL IN ELECTRIC AIRCRAFT," which is a continuation in-part of Non-provisional application Ser. No. 17/197,427 filed on Mar. 10, 2021 and entitled "SYSTEM AND METHOD FOR FLIGHT CONTROL IN ELECTRIC AIRCRAFT," the entirety of these applications are incorporated herein by reference. This application is a continuation-in-part of Non-provisional application Ser. No. 17/972,856 filed on Oct. 25, 2022, and entitled "METHODS AND SYSTEMS FOR FLIGHT CONTROL CONFIGURED FOR USE IN AN ELECTRIC AIRCRAFT," which is a continuation in part of U.S. patent application Ser. No. 17/218,428, filed on Mar. 31, 2021, entitled "METHODS AND SYSTEMS FOR FLIGHT CONTROL CONFIGURED FOR USE IN AN ELECTRIC AIRCRAFT," both of which are incorporated by reference herein in its entirety.

FIELD OF THE INVENTION

The present invention generally relates to the field of electric aircrafts. In particular, the present invention is directed to systems and methods for flight control for an electric aircraft.

BACKGROUND

Automated control is indispensable in operating an electric vehicle. A flight control system is paramount in operating an electric vehicle safely. It is important for a flight control system to allow a pilot to control an aircraft in an intuitive manner.

SUMMARY OF THE DISCLOSURE

In an aspect, a flight control system for an electric aircraft, the system including a pilot input communicatively connected to an electric aircraft, wherein the pilot input is configured to receive an input datum. The system also including a plurality of flight components communicatively connected to the electric aircraft, wherein the plurality of flight components includes a plurality of control surfaces. The system also includes a flight controller communicatively connected to the pilot input and the plurality of flight control surfaces, wherein the flight controller is configured to determine a phase of flight, determine a command datum to control a position of the plurality of control surfaces as a function of the input datum, and command, when the phase of flight is determined to be hover, the plurality of control surfaces using the command datum.

In another aspect, a method of flight control for an electric aircraft, the method including receiving an input datum, by a pilot input communicatively connected to an electric aircraft, wherein the electric aircraft includes a plurality of flight components communicatively connected to the electric aircraft, wherein the plurality of flight components includes a plurality of control surfaces. The electric aircraft further including a flight controller communicatively connected to the sensor and the plurality of flight control surfaces. The method further including determining, by the flight controller, a phase of flight. The method further including determining, by the flight controller, a command datum to control a position of the plurality of control surfaces as a function of the input datum. The method further including commanding, by the flight controller, when the phase of flight is determined to be hover, the plurality of control surfaces using the command datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for flight control using a pilot input, where the pilot input may be an inceptor, joystick, lever, or the like.

Aspects of the present disclosure can be used to relay movements in the pilot input into commands for the flight components on the electric aircraft. Commands corresponding to actions taken on the pilot input may be consistent, independent of different phases of flight. Commands may be stored as input mapping such that each phase of flight is mapped to certain commands for the pilot input.

Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
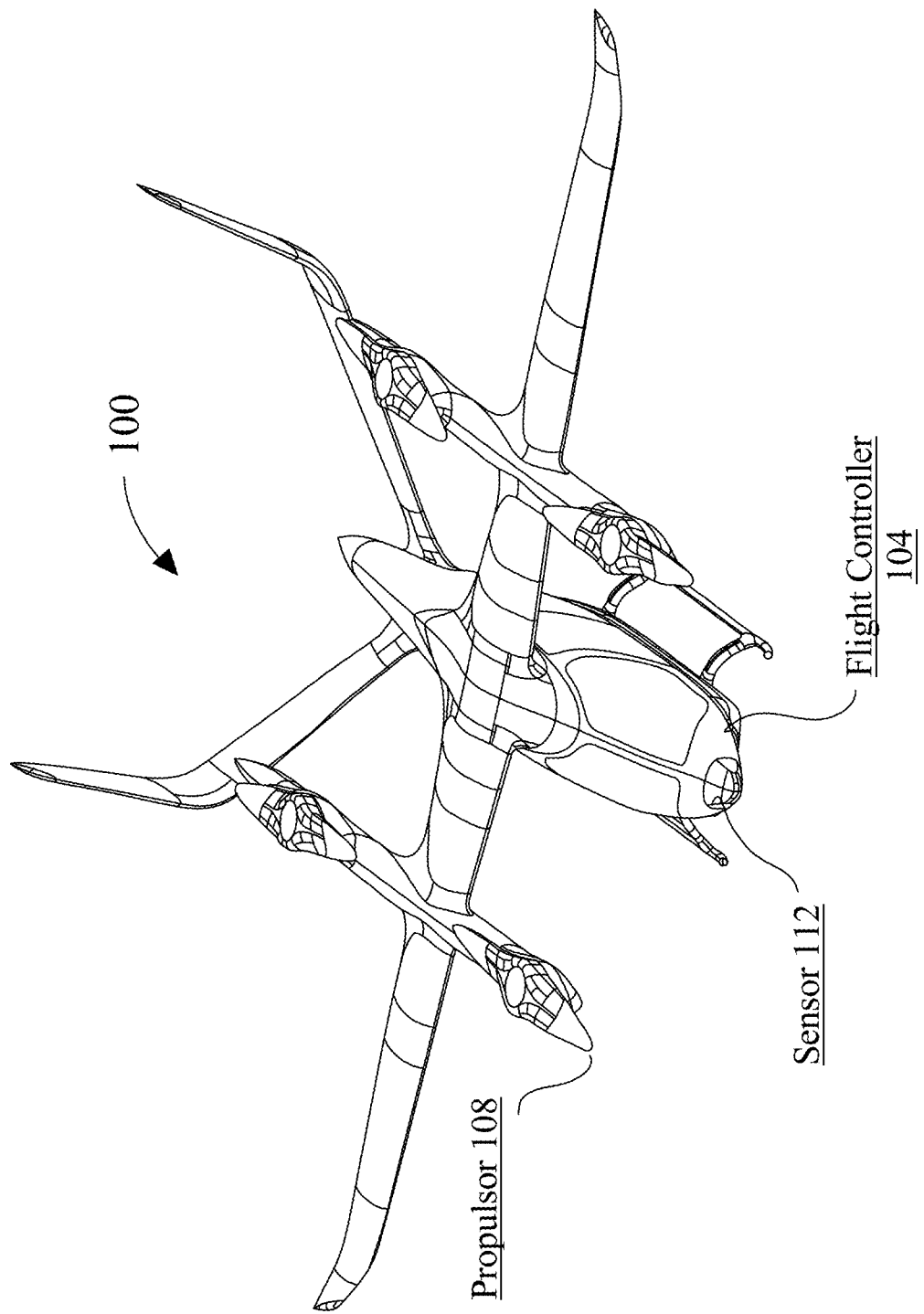
FIG. 1 is an illustration of an exemplary embodiment of an electric aircraft.

Referring now to FIG. 1, an exemplary embodiment of an electric aircraft 100 is depicted. Aircraft 100 includes a flight controller 104. Flight controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Flight controller 104 may include a single computing device operating independently, or may include two or more computing device operating in concert, in parallel, sequentially or the like; two or more computing devices may be included together in a single computing device or in two or more computing devices. Flight controller 104 may interface or communicate with one or more additional devices as described below in further detail via a network interface device. Network interface device may be utilized for connecting flight controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. flight controller 104 may include but is not limited to, for example, a computing device or cluster of computing devices in a first location and a second computing device or cluster of computing devices in a second location. flight controller 104 may include one or more computing devices dedicated to data storage, security, distribution of traffic for load balancing, and the like. Flight controller 104 may distribute one or more computing tasks as described below across a plurality of computing devices of computing device, which may operate in parallel, in series, redundantly, or in any other manner used for distribution of tasks or memory between computing devices. flight controller 104 may be implemented using a "shared nothing" architecture in which data is cached at the worker, in an embodiment, this may enable scalability of system 100 and/or computing device.

With continued reference to FIG. 1, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, aircraft 100 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. Aircraft 100 may include a propulsor 108 configured to generate lift on aircraft 100. A "propulsor," as used herein, is a component or device used to propel a craft by exerting force on a fluid medium, which may include a gaseous medium such as air or a liquid medium such as water. Propulsor 108 may be any device or component that propels an aircraft or other vehicle while on ground and/or in flight. Propulsor 108 may include one or more propulsive devices. Propulsor 108 may include a lift propulsor configured to create lift for aircraft 100. As used in this disclosure, "lift" is a force exerted on an aircraft that directly opposes the weight of the aircraft. In an embodiment, propulsor 108 may include a thrust element which may be integrated into the propulsor 108. As used in this disclosure, a "thrust element" is any device or component that converts mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, propulsor 108 may include a pusher propeller. Pusher propeller may be mounted behind the engine to ensure the drive shaft is in compression. Pusher propeller may include a plurality of blades, for example, two, three, four, five, six, seven, eight, or any other number of blades. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 108 may include at least a blade. Persons skilled in the art, upon reviewing the entirety of this disclosure, will be aware of various devices that may be used as propulsor 108. In an embodiment, when a propulsor twists and pulls air behind it, it will, at the same time, push the aircraft with an equal amount of force. The more air pulled behind the aircraft, the more the aircraft is pushed forward. In an embodiment, thrust element may include a helicopter rotor incorporated into propulsor 108. A "helicopter rotor," as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements. Propulsor 108 may be substantially rigid and not susceptible to bending during flight. Therefore, in some embodiments, the blades of propulsor 108 may be rigid such that they are unable to feather. As used in this disclosure, a propulsor blade "feathers" when it changes its pitch. For example, for a blade that is configured to feather, forces exerted by a fluid on a moving vehicle when a propulsor is not rotating may cause the blade to adjust its pitch so the blade is parallel to the oncoming fluid.

With continued reference to FIG. 1, propulsor 108 may be a lift propulsor oriented such that propulsor plane is parallel with a ground when aircraft 100 is landed. As used in this disclosure, a "propulsor plane" is a plane in which one or more propulsors rotate. Propulsor plane may generally be orthogonal to an axis of rotation, such as rotational axis A. For example, when aircraft 100 is not traveling horizontally, propulsor plane may be orthogonal to rotational axis A. When there is a substantial force exerted on propulsor 108 that is orthogonal to rotational axis A, such as air resistance during edgewise flight, the force may cause significant stress and strain against propulsor 108. As used in this disclosure, "edgewise flight" is a flight orientation wherein an air stream is substantially directed at an edge of a lift propulsor. Edgewise flight may occur when an aircraft is traveling in a direction orthogonal to a rotational axis of a lift propulsor and parallel to a propulsor plane of the lift propulsor, causing an air stream to be directed at an edge of the lift propulsor. Edgewise flight may also occur when an aircraft is traveling in a direction in which a component of the velocity of the aircraft is in a direction orthogonal to a rotational axis of a lift propulsor and parallel to a propulsor plane of the lift propulsor. Additional forces, in addition to the air resistance, may also create significant stress and strain on propulsor 108. As a non-limiting example, as aircraft 100 travels in edgewise flight, propulsor 108 may rotate such that an advancing blade of the propulsor 108 is rotating forward and into incoming air, while a receding blade of the propulsor 108 is rotating backward and away from incoming air. As used in this disclosure, an "advancing blade" is a blade of a lift propulsor that is instantaneously moving substantially in the same direction as the aircraft's forward motion. As used in this disclosure, a "receding blade" is a blade of a lift propulsor that is instantaneously moving substantially in an opposite direction to the aircraft's forward motion. Because blades of propulsor 108 have airfoil cross sections, advancing blade produces greater lift than receding blade due to the relative motion of each of the blades relative to the oncoming air.

In another embodiment, and still referring to FIG. 1, propulsor 108 may include a propeller, a blade, or any combination of the two. A propeller may function to convert rotary motion from an engine or other power source into a swirling slipstream which may push the propeller forwards or backwards. Propulsor 108 may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Additional disclosure related to an electric motor or a propulsor can be found in U.S. patent application Ser. No. 17/564,404, filed on Dec. 29, 2021, and entitled "SYSTEM FOR A VERTICAL TAKEOFF AND LANDING AIRCRAFT WITH AN IN-BOOM LIFT PROPULSOR," the entirety of which is incorporated herein by reference. Continuing to refer to FIG. 1, aircraft 100 includes a sensor 112. As used in this disclosure, a "sensor" is a device that is configured to detect a phenomenon and transmit information related to the detection of the phenomenon electronically. Sensor 112 may be configured to detect an input datum from a pilot input. A pilot input may include an inceptor, steering wheel, control wheel, control stick, pedal, levers, or the like. Input datum and pilot input are discussed in further detail below. Sensor 112 may be physically and/or communicatively connected to the pilot input. Sensor may also be located on other parts of the aircraft 100 in order to detect other phenomenon pertaining to flight control. In an embodiment, sensor 112 may be configured to detect speed, direction, force, torque, or the like into a sensed signal. Sensor 112 may include one or more sensors which may be the same, similar or different. Sensor 112 may include a plurality of sensors which may be the same, similar or different. Sensor 112 may include one or more sensor suites with sensors in each sensor suite being the same, similar or different. For example, and without limitation, sensor 112 may include a gyroscope, accelerometer, magnetometers, inertial measurement unit (IMU), pressure sensor, proximity sensor, displacement sensor, force sensor, vibration sensor, and the like. Sensor 112 may efficaciously include, without limitation, any of the sensors disclosed in the entirety of the present disclosure.

With continued reference to FIG. 1, aircraft 100 may include an inertial measurement unit (IMU). IMU may detect an aircraft angle. An aircraft angle may include any information about the orientation of the aircraft in three-dimensional space such as pitch angle, roll angle, yaw angle, attitude, or some combination thereof. In non-limiting examples, an aircraft angle may use one or more notations or angular measurement systems like polar coordinates, cartesian coordinates, cylindrical coordinates, spherical coordinates, homogenous coordinates, relativistic coordinates, or a combination thereof, among others. IMU may detect an aircraft angle rate. Aircraft angle rate may include any information about the rate of change of any angle associated with an electrical aircraft. Any measurement system may be used in the description of the aircraft angle rate. Aircraft 100 may include an attitude indicator (AI) to inform the pilot of the aircraft orientation relative to Earth's horizon. Attitude indicator may use a gyroscope to determine aircraft angle or attitude. As used herein, "attitude" is the angular difference measured between an aircraft's axis (longitudinal, transverse) and the line of the Earth's horizon.

Figure 2:
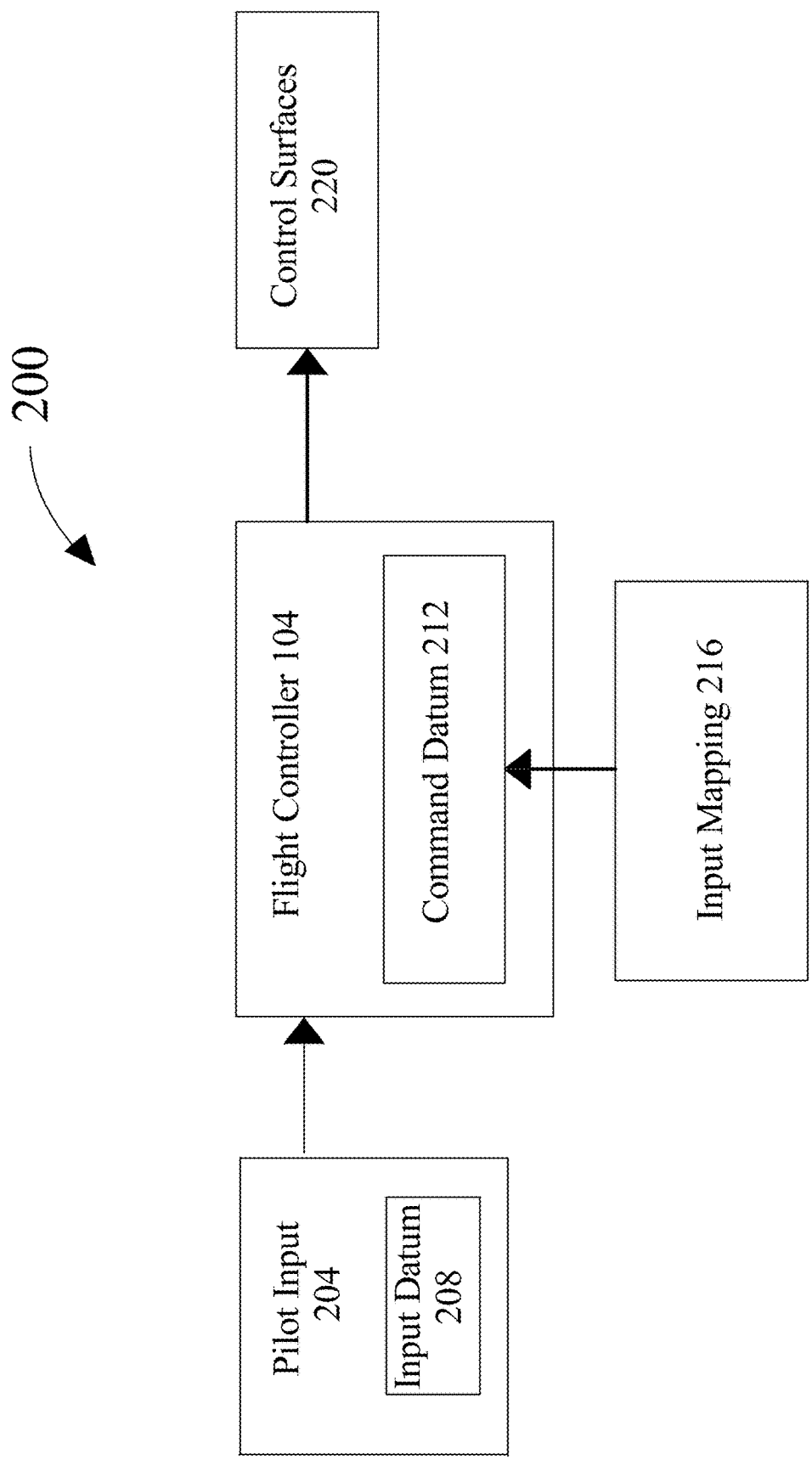
FIG. 2 is a block diagram of an exemplary embodiment of a flight control system.

Now referring to FIG. 2, a block diagram of a flight control system 200 is depicted. Flight control system 200 may include pilot input 204 to flight controller 104. Pilot input 204 is communicatively connected to aircraft 100. As used herein, a "pilot input" is a device that receives commands from a user to control an aircraft. For example, a pilot input may include a throttle lever, inceptor stick, collective pitch control, steering wheel, brake pedals, pedal controls, toggles, joystick. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Pilot input 204 may be physically located in the fuselage of the aircraft 100 or remotely located outside of the aircraft in another location, while being communicatively connected to at least an element of the aircraft 100. "Communicatively connection", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. Pilot input 204 may include buttons, switches, or other binary inputs in addition to, or alternatively than digital controls about which a plurality of inputs may be received. Pilot input 204 may control pitch, yaw, and roll of the aircraft. Pilot input 204 may use an inceptor or the like to control pitch, yaw, and roll. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. The three axes may include a longitudinal axis, transverse axis, and yaw axis. "Longitudinal axis", as used herein, refers to an imaginary axis that runs along the axis of symmetry of the fuselage. "Transverse axis", as used herein, runs parallel to a line running from wing tip to wing tip of the aircraft, which is orthogonal to the longitudinal axis. "Yaw axis", as used herein, is an imaginary axis that runs orthogonal to the longitudinal and transverse axis. "Pitch", for the purposes of this disclosure refers to an aircraft's angle of attack, and is aircraft's rotation about the transverse axis. For example, an aircraft pitches "up" when the angle of attack is positive, like in a climb maneuver. In another example, the aircraft pitches "down", when the angle of attack is negative, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to rotation about an aircraft's longitudinal axis. "Yaw", for the purposes of this disclosure, refers to rotation about the yaw axis. As used herein, "Throttle", for the purposes of this disclosure, refers to an aircraft outputting an amount of thrust from a propulsor. Pilot input, when referring to throttle, may refer to a pilot's desire to increase or decrease thrust produced by at least a propulsor.

Still referring to FIG. 2, pilot input 204 may include input datum 208. As used in this disclosure, an "input datum," is an element of data describing a manipulation of one or more pilot inputs that correspond to a desire to affect an aircraft's trajectory or attitude. Input datum 208 may include data on a displacement input or a force input from a user manipulating an inceptor. For instance, an input datum may include an electronic signal from the physical manipulation of a pilot input, such as pulling a lever, or pushing down a button. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 112 may include circuitry, computing devices, electronic components or a combination thereof that translates pilot input into at least an input datum 208 configured to be transmitted to any other electronic component.

Continuing to refer to FIG. 2, input datum 208 may be transmitted to a flight controller 104. Flight controller 104 is configured to determine a command datum 212 to control surfaces 220 as a function of the input datum 208. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure. A "command datum" as used herein, is an element of data describing the manipulation of one or more flight components as a response to the input datum. A "flight component" as used herein, includes components related to, and mechanically connected to an aircraft that manipulates a fluid medium in order to propel and maneuver the aircraft through the fluid medium. In an embodiment, flight component may include ailerons, rudders, motors, propulsors or the like. Flight controller 104 may use command datum 212 to control the control surfaces 220.

With continued reference to FIG. 2, flight controller 104 is configured to determine a phase of flight. A "phase of flight" as used herein, is a period within a flight, wherein a flight begins when a payload, such as passengers, board the aircraft, and ends when the payload disembarks the aircraft. A phase of flight may include: taxi, takeoff, initial climb, climb to cruise altitude, cruise altitude, descent, approach, hover, conventional flight, and/or landing. Additionally, phase of flight may include vertical take-off, hover, transition, and/or fixed wing flight. Different phases of flight may require different attitudes and speeds of the aircraft 100. In some embodiments, flight controller 104 may determine a phase of flight as a function of input datum 208 from pilot input 204. As a non-limiting example, pilot input may be a lift lever wherein, when the lift lever is in a zero-lift position, the flight controller may determine that the phase of flight is hover. As a non-limiting example, pilot input may include a lift lever and a thrust wheel wherein, when the lift lever is in a zero lift position and the thrust wheel is in a non-zero position, the flight controller may determine that the phase of flight is hover. As a non-limiting example, when the lift lever is in a zero-lift position, flight controller may determine that the phase of flight is conventional flight. As a non-limiting example, when the lift lever is in a non-zero lift position and thrust wheel is in a non-zero position, flight controller may determine that the phase of flight depending on the position of the thrust wheel: if the position of the thrust wheel indicates a thrust over a certain thrust threshold, then the flight controller may determine that the phase of flight is transition; and if the position of the thrust wheel indicates a thrust below a certain thrust threshold, then the flight controller may determine that the phase of flight is hover. In some embodiments, phase of flight may be determined using a pilot input, such as a selection on a pilot display, toggle button, switch press, and/or the like.

Continuing to reference FIG. 2, command datum 212 may also be determined as a function of input mapping 216. "Input mapping" as used herein is the way by which the input datum is interpreted by the flight controller. The input mapping may comprise one or more settings that correspond to particular ways of interpreting input datum. For example, a setting may include rate command or attitude command. As a non-limiting example, a pilot input may be mapped to at least attitude command or at least rate command. "Attitude command" as used herein, refers to when the displacement of a pilot input translates to a position of the aircraft. In some embodiments, zero displacement of the pilot input 204 may translate to a command datum 212 that tells the aircraft 100 to assume an attitude of zero pitch, roll, and/or yaw angles. In another example, a pilot may displace the pilot input 204 by 0.05 radians. This may translate to an aircraft pitch of 0.05 radians. "Rate command" as used herein, is when the pilot input is mapped to a constant angular rate. For example, zero displacement of the pilot input 204 translates to a command datum 212 that commands a zero attitude-rate, meaning that there is no change in the movement of the aircraft 100. In another embodiment, a displacement of 0.05 radians (rad) on the pilot control may translate to a constant aircraft pitch rate of 0.05 radians/second. In another embodiment, a displacement of 0.10 rad to the right of the default position, which may translate to a roll rate of 0.10 rad/second. Input mapping may also include hold settings, such as rate hold or attitude hold. "Rate hold" as used herein, is when the aircraft maintains the same angular rate even if the user is no longer engaging the pilot input. "Attitude hold" as used herein, is when the aircraft maintains the same attitude even if the user is no longer engaging the pilot input. Rate hold and attitude hold may remove the need for constant input into the pilot input. Flight controller may discontinue the rate hold or the attitude hold once it received a new input datum 208 from the pilot input 204 and the pilot. Input mapping 216 may be set by the pilot or by the flight controller through predetermined settings, as discussed below.

Continuing to reference FIG. 2, input mapping 216 may be changed as a function of a phase of flight. A user of the aircraft, such as a pilot, may have preferences as to the input mapping 216 of the pilot input 204 during different phases of flight. A pilot may select an input mapping 216 on a display connected to the flight controller 104 for different phases of flight. In some embodiments, command datum 212 may not change during different phases of flight. As a non-limiting example, command datum 212 may be a first command to control surfaces 220 during a hover mode. However, during a change in phase of flight, command datum 212 may remain the same and thus control surfaces 220 may perform the same action as in the initial phase of flight. This may reduce or eliminate any flapping around of control surfaces 220. Further, this may enable easier change of phases of flight as a pilot may initiate actions for control surfaces 220 for a next phase of flight preemptively, without negatively affecting a current phase of flight.

With continued reference to FIG. 2, in some embodiments, flight controller 104 may use an input mapping 216 of rate command and attitude hold during transition. "Transition," for the purposes of this disclosure, is a phase of flight where the aircraft is in between purely vertical flight and purely edgewise flight. For example, an aircraft may conduct a vertical take off and once it reaches a particular height, begin transitioning to edgewise flight by increasing the aircraft's horizontal velocity. Once the aircraft begins transitioning to edgewise flight, flight controller may switch input mapping 216 to rate command and attitude hold. In some instances, flight controller 104 may not use input mapping, but rather command datum 212 to command control surfaces to perform rate command and attitude hold, as described herein.

With continued reference to FIG. 2, in some embodiments, flight controller 104 may use an input mapping 216 of attitude command attitude hold during hover. "Hover," for the purposes of this disclosure, is a phase of flight, wherein the aircraft is generating thrust purely through its lift propulsor(s). For example, an aircraft may perform a vertical take-off using an attitude command attitude hold input mapping 216 and then transition to edgewise flight, wherein, once the transition begins, flight controller 104 may switch input mapping 216 to rate command attitude hold. As another non-limiting example, aircraft may transition from edgewise flight to hover using an input mapping 216 of rate command attitude hold and then flight controller 104 may switch input mapping 216 to attitude command attitude hold once aircraft is in hover. In some embodiments, input mapping 216 may remain the same during a transition from edgewise flight to hover.

Still referring to FIG. 2, flight controller 104 is configured to command, when the phase of flight is determined to be hover, the plurality of control surfaces using the command datum. In some embodiments, command datum 212 may be used by flight controller 104 to command control surfaces 220 during hover mode, conventional flight mode, and any transition between modes. It should be noted that control surfaces 220 may be commanded in any flight mode described in this disclosure. In some embodiments, command datum 212 may cause control surfaces 220 to perform various maneuvers. In some instances, control surfaces 220 may alter an aircraft's attitude, speed, pitch, yaw, roll, or the like. In some embodiments, command datum 212 may command control surfaces 220 to transition from one flight mode to another. However, in some instances, control surfaces 220 may be commanded to be in the same position during a transition of flight modes. Commanding control surfaces 220 during hover may differ from the conventional method of control surface control during hover. Typically, when an aircraft is in a hover mode, the control surfaces are allowed to flap, meaning that they are not actively commanded. Thus, active command of control surfaces 220 presents an improvement over the conventional method due to, for example, allowing for greater control over the aircraft during hover. Alternatively, active command of control surfaces 220 during hover adds to the complexity of the control system of the aircraft due to, at least, the distict aerodynamic conditions present during hover.

Continuing to reference FIG. 2, flight controller 104 may use servomechanisms to control one or more of attitude and rate of aircraft. For example, in response to the pilot input 204 and one or more sensors (e.g. air speed sensors, attitude sensors, IMUs, and the like), flight controller may adjust propulsor speed and/or propulsor blade angle and/or the like, to achieve the desired command datum 212. Flight controller 104 may use PID controllers, feedback loops, error loops, or the like to adjust flight components to achieve the desired command datum 212. Additional disclosures regarding servomechanisms may be found in U.S. patent application Ser. No. 17/383,629 filed on Jul. 23, 2021 and titled "SYSTEM AND METHOD FOR DISTRIBUTED FLIGHT CONTROL SYSTEM FOR AN ELECTRIC VEHICLE". Additional disclosures on flight control may be found in U.S. patent application Ser. No. 17/478,143 filed on Sep. 17, 2021 and titled "METHODS AND SYSTEMS FOR FLIGHT CONTROL CONFIGURED FOR USE IN AN ELECTRIC AIRCRAFT".

Figure 3:
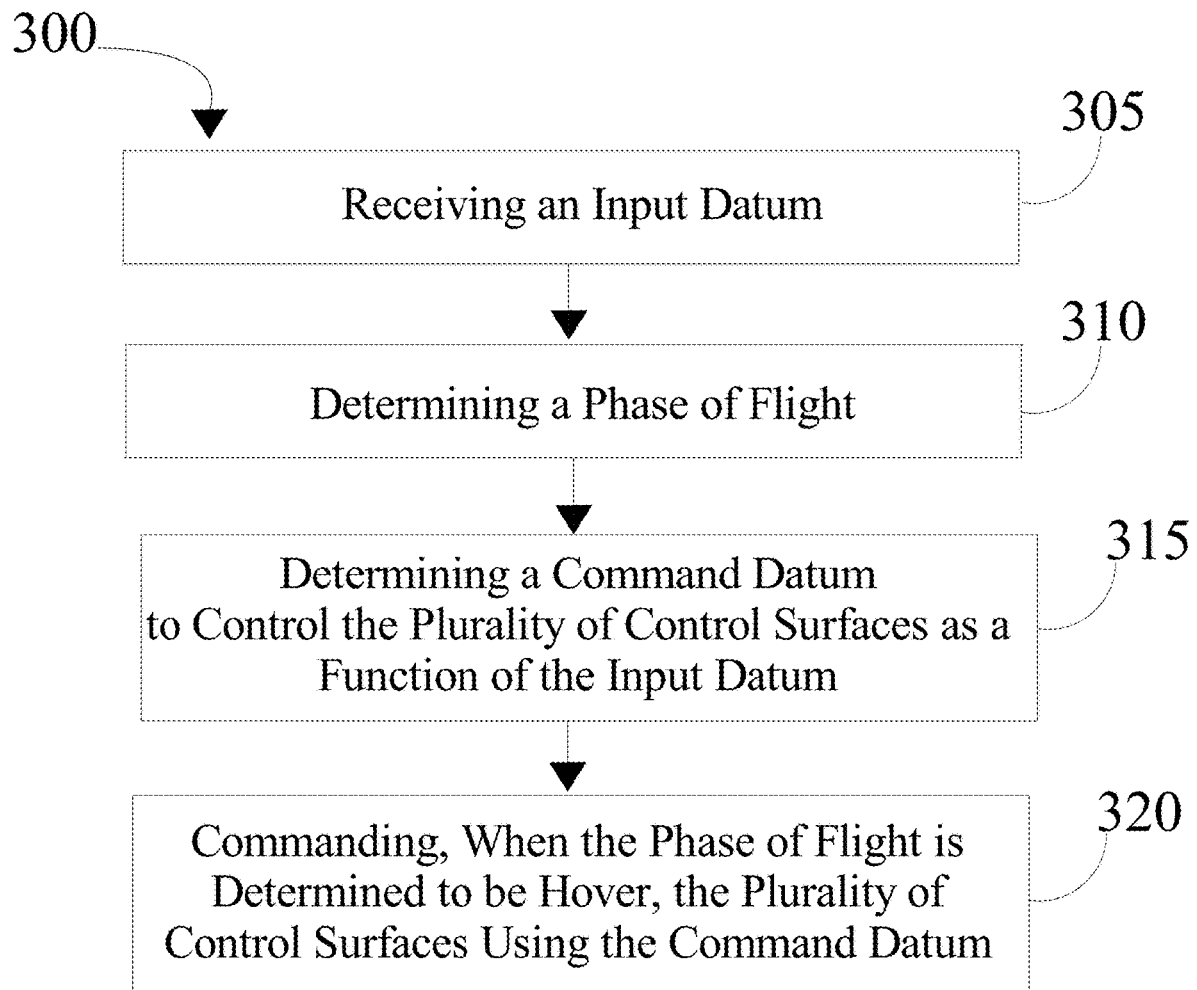
FIG. 3 is a flow diagram of an exemplary embodiment of a method of flight control for an electric aircraft.

Now referring to FIG. 3, a method for flight control of an electric aircraft 300, is shown. The method may include, at step 305, receiving an input datum. In some embodiments, input datum may be received by a pilot input communicatively connected to an electric aircraft. In some embodiments, pilot input may include an inceptor stick. This may be implemented in accordance with FIGS. 1-2 above.

Still referring to FIG. 3, at step 310 method 300 includes determining a phase of flight. In some embodiments the phase of flight may be determined to be hover. In some embodiments, the phase of flight may be determined to be conventional (or edgewise) flight. This may be implemented in accordance with FIGS. 1-2 above.

Still referring to FIG. 3, at step 315, method 300 includes determining a command datum to control a position of the plurality of control surfaces as a function of the input datum. In some embodiments, the plurality of control surfaces may include a plurality of rudders, ailerons, or any control surfaces described herein. In some embodiments, command datum may include an attitude hold, a rate hold, a rate command, or any command as described herein. In some embodiments, command datum may determine a speed, attitude, or the like, of an electric aircraft. In some embodiments, the command datum may be a function of an input mapping. This may be implemented in accordance with FIGS. 1-2 above.

Still referring to FIG. 3, at step 320, method 300 may include commanding, by the flight controller, when the phase of flight is determined to be hover, the plurality of control surfaces using the command datum. In some embodiments, method 300 may include commanding, by the flight controller, when the phase of flight is determined to be conventional flight, the plurality of control surfaces using the command datum. This may be implemented in accordance with FIGS. 1-2 above.

Figure 4:
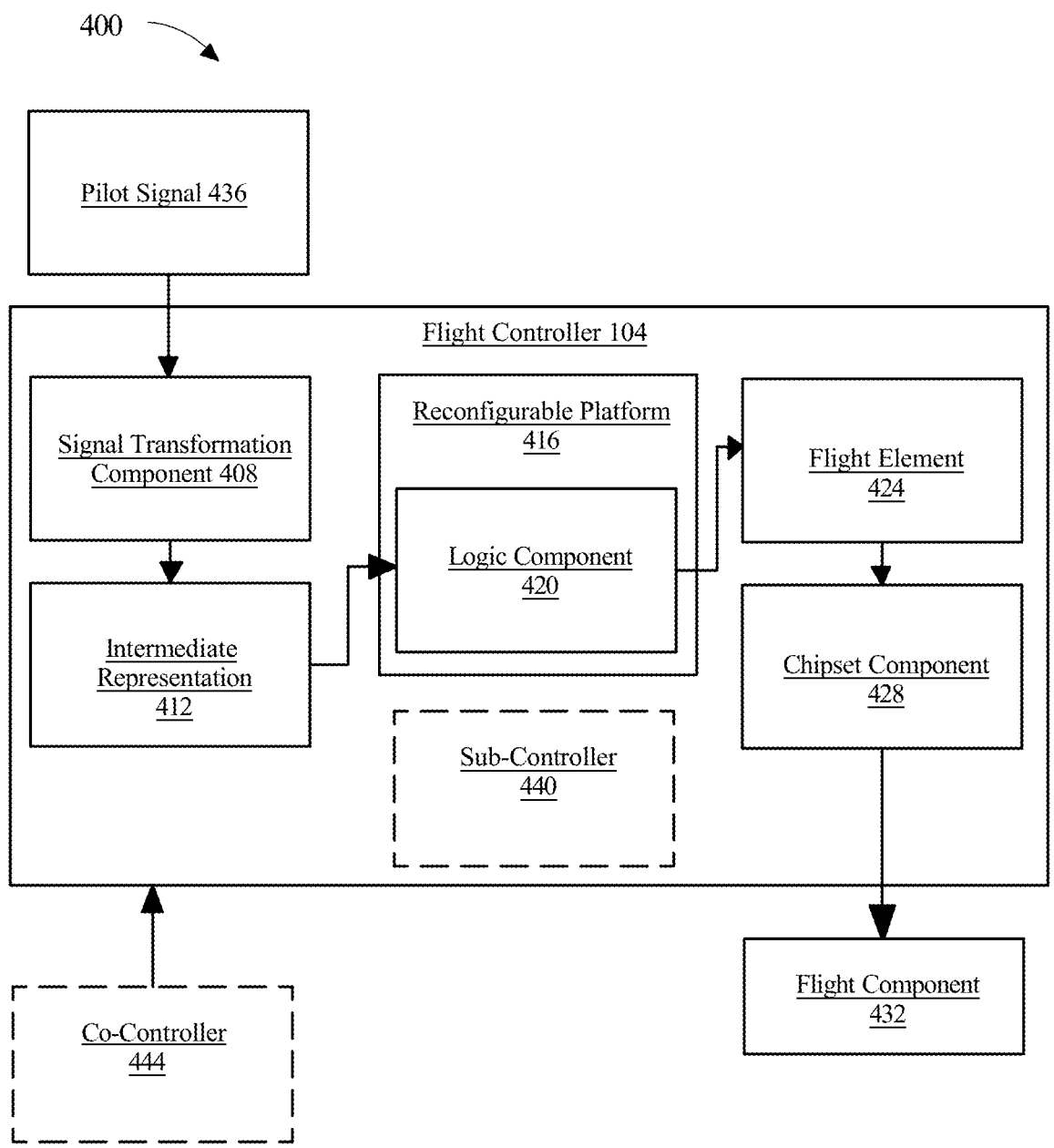
FIG. 4 is a block diagram illustrating an exemplary embodiment of a flight controller.

Now referring to FIG. 4, an exemplary embodiment 400 of a flight controller 104 is illustrated. As used in this disclosure a "flight controller" is a computing device of a plurality of computing devices dedicated to data storage, security, distribution of traffic for load balancing, and flight instruction. Flight controller 104 may include and/or communicate with any computing device as described in this disclosure, including without limitation a microcontroller, microprocessor, digital signal processor (DSP) and/or system on a chip (SoC) as described in this disclosure. Further, flight controller 104 may include a single computing device operating independently, or may include two or more computing device operating in concert, in parallel, sequentially or the like; two or more computing devices may be included together in a single computing device or in two or more computing devices. In embodiments, flight controller 104 may be installed in an aircraft, may control the aircraft remotely, and/or may include an element installed in the aircraft and a remote element in communication therewith.

In an embodiment, and still referring to FIG. 4, flight controller 104 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 104. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 104 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 104. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 104 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 532 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 104 may be configured generate an autonomous function. As used in this disclosure an "autonomous function" is a mode and/or function of flight controller 104 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 104 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 104 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 104 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 104 to control and/or maintain a portion of aircraft, a portion of the flight plan, the entire aircraft, and/or the entire flight plan. As a further non-limiting example, pilot signal 436 may include an implicit signal, wherein flight controller 104 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 104 and/or a remote device may or may not use in the generation of autonomous function. As used in this disclosure "remote device" is an external device to flight controller 104. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 104 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 104 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 104. Remote device and/or FPGA may transmit a signal, bit, datum, or parameter to flight controller 104 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 104 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 104 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 104 may include, but is not limited to, for example, a cluster of flight controllers in a first location and a second flight controller or cluster of flight controllers in a second location. Flight controller 104 may include one or more flight controllers dedicated to data storage, security, distribution of traffic for load balancing, and the like. Flight controller 104 may be configured to distribute one or more computing tasks as described below across a plurality of flight controllers, which may operate in parallel, in series, redundantly, or in any other manner used for distribution of tasks or memory between computing devices. For example, and without limitation, flight controller 104 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 104. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 104 may also be implemented using a "shared nothing" architecture in which data is cached at the worker, in an embodiment, this may enable scalability of aircraft and/or computing device. Flight controller 104 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 104 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 104 as components and/or nodes of a distributer flight controller as described above. For example, and without limitation, co-controller 444 may include one or more controllers and/or components that are similar to flight controller 104. As a further non-limiting example, co-controller 444 may include any controller and/or component that joins flight controller 104 to distributer flight controller. As a further non-limiting example, co-controller 444 may include one or more processors, logic components and/or computing devices capable of receiving, processing, and/or transmitting data to and/or from flight controller 104 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
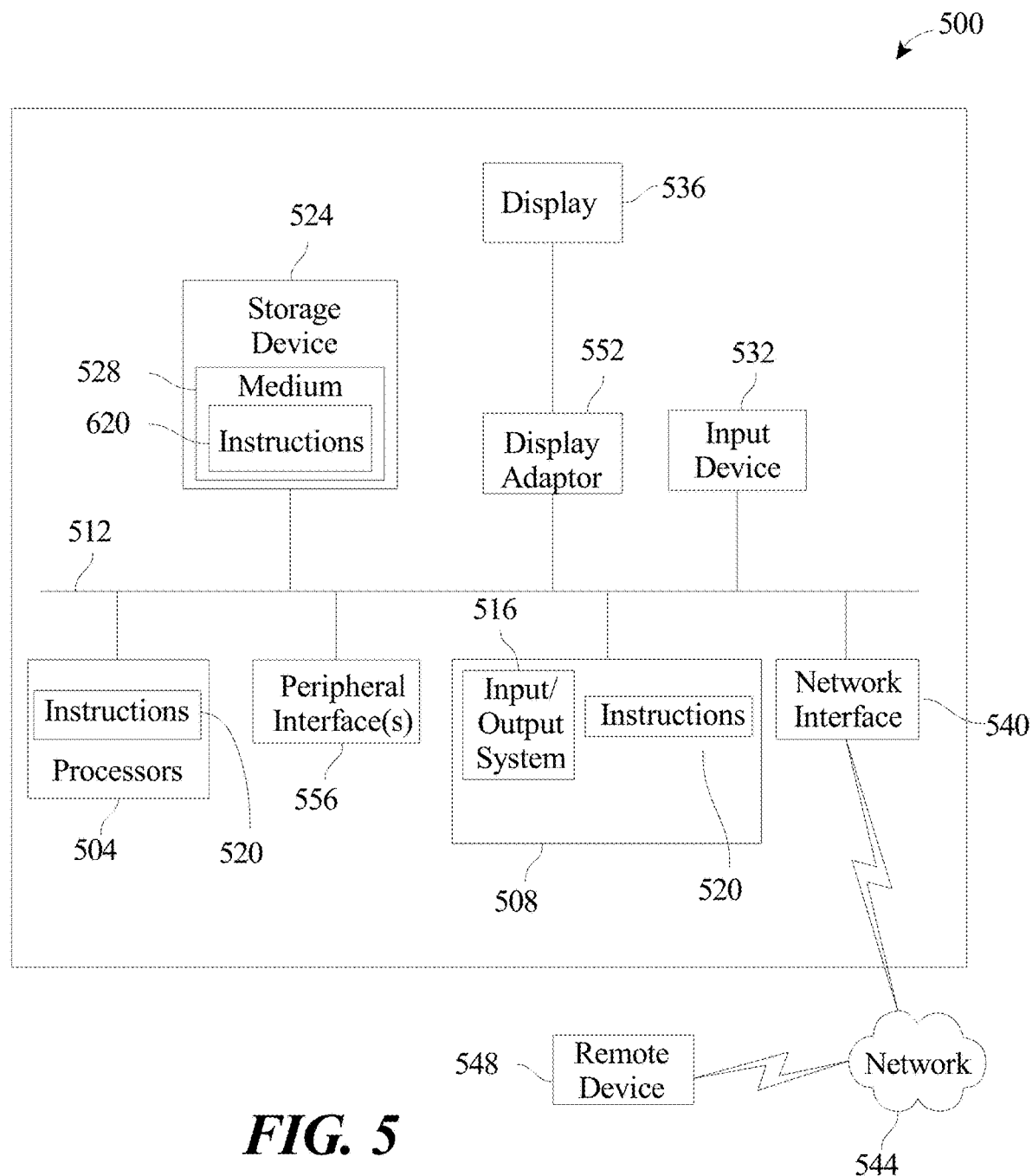
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A flight control system for an electric aircraft, the system comprising:
   a pilot input communicatively connected to an electric aircraft, wherein the pilot input is configured to receive an input datum;
   a plurality of flight components communicatively connected to the electric aircraft, wherein the plurality of flight components comprise a plurality of control surfaces;
   a flight controller communicatively connected to the pilot input and the plurality of flight control surfaces, wherein the flight controller is configured to:
   determine a phase of flight;
   determine a command datum to control a position of the plurality of control surfaces as a function of the input datum; and
   command, when the phase of flight is determined to be hover, the plurality of control surfaces using the command datum.

2. The system of claim 1, wherein the plurality of control surfaces comprises at least a rudder.

3. The system of claim 1, wherein the plurality of control surfaces comprises a plurality of ailerons.

4. The system of claim 1, wherein the command datum is configured to cause the plurality of control surfaces to perform an attitude hold.

5. The system of claim 1, wherein the command datum is configured to cause the plurality of control surfaces to perform a rate hold.

6. The system of claim 1, wherein command datum comprises a rate command.

7. The system of claim 1, wherein the pilot input comprises an inceptor stick.

8. The system of claim 1, wherein detecting the phase of flight comprises detecting a change in the phase of flight, wherein the change in the phase of flight comprises a transition from a hover mode to a conventional flight mode.

9. The system of claim 1, wherein the command datum is configured to control a speed of the electric aircraft.

10. The system of claim 1, wherein the command datum is configured to control an attitude of the electric aircraft.

11. A method of flight control for an electric aircraft, the method comprising:
    receiving an input datum, by a pilot input communicatively connected to an electric aircraft, wherein the electric aircraft comprises:
    a plurality of flight components communicatively connected to the electric aircraft, wherein the plurality of flight components comprise a plurality of control surfaces; and
    a flight controller communicatively connected to one or more sensors and the plurality of flight control surfaces;
    determining, by the flight controller, a phase of flight;
    determining, by the flight, controller, a command datum to control a position of the plurality of control surfaces as a function of the input datum; and
    commanding, by the flight controller, when the phase of flight is determined to be hover, the plurality of control surfaces using the command datum.

12. The method of claim 11, wherein commanding the plurality of control surfaces further comprises controlling at least a rudder.

13. The method of claim 11, wherein commanding the plurality of control surfaces further comprises controlling a plurality of ailerons.

14. The method of claim 11, wherein the command datum is configured to cause the plurality of control surfaces to perform an attitude hold.

15. The method of claim 11, wherein the command datum is configured to cause the plurality of control surfaces to perform a rate hold.

16. The method of claim 11, wherein determining the command datum further comprises determining a rate command.

17. The method of claim 11, wherein receiving the input datum further comprises receiving the input datum by an inceptor stick.

18. The method of claim 11, wherein detecting the phase of flight comprises detecting a change in the phase of flight, wherein the change in the phase of flight comprises a transition from a hover mode to a conventional flight mode.

19. The method of claim 11, wherein the command datum is configured to control a speed of the electric aircraft.

20. The method of claim 11, wherein the command datum is configured to control an attitude of the electric aircraft.

* * * * *